United States Patent [19] [11] 4,188,061
Shehi [45] Feb. 12, 1980

[54] AUTOMOBILE TRUNK LID HOLDER

[76] Inventor: Lyle E. Shehi, 19 Ontario Dr., Chattanooga, Tenn. 37415

[21] Appl. No.: 884,123

[22] Filed: Mar. 7, 1978

[51] Int. Cl.² .................... B62D 25/10
[52] U.S. Cl. .................... 296/76; 297/479
[58] Field of Search .................... 296/76; 280/744; 297/388

[56] References Cited

U.S. PATENT DOCUMENTS 2,671,423 3/1954 Mead .................... 296/76
3,411,602 11/1968 Royce .................... 297/388
3,971,589 7/1976 Elrod .................... 296/76
3,981,535 9/1976 Henderson .................... 297/388

*Primary Examiner*—Philip Goodman
*Attorney, Agent, or Firm*—Newton, Hopkins & Ormsby

[57] ABSTRACT

A spring-urged hinged strap buckle component on the underside of an automobile trunk lid receives a mating buckle component of an extensible strap wound on a spring reel whose housing is secured to the trunk bed in an out of the way location. The device is essentially rattle-free and very convenient to operate.

5 Claims, 5 Drawing Figures

AUTOMOBILE TRUNK LID HOLDER

BACKGROUND OF THE INVENTION

U.S. Pat. No. 3,971,589 discloses an automobile trunk lid tie-down arrangement upon which the present invention constitutes an improvement.

More particularly, this invention seeks to provide a trunk lid holder which employs an extensible and retractable strap and buckle means of the type commonly used for automobile seat belts and safety harness. Such nylon straps and their hardware are more acceptable to automobile owners for the purpose or use intended herein for several reasons. The automobile owners are accustomed to manipulating the type of buckle structure employed and the strap and its attendant hardware can be made to blend nicely with the automotive decor which is of prime importance for any automotive attachment.

In addition to convenience of use and acceptability by automobile owners, the invention seeks to improve on the prior art in terms of the strength and reliability of the invention and greater freedom from rattling when the device is not in use. Features of the present invention which distinguish it from the prior art are the mounting on the underside of the trunk lid of a female strap buckle component carried by one leaf of a hinge whose other leaf is fixedly secured to the trunk lid. The movable hinge leaf is biased by a spring to lie snugly and firmly against a rear ledge of the trunk lid while the device is idle. The housing of the spring reel mounted strap is secured in an out of the way location in the bed of the trunk on the vertical wall of a trunk lid latch mounting bracket with the strap attached male buckle component facing upwardly.

Other features and advantages of the invention will become apparent during the course of the following description.

DETAILED DESCRIPTION

Figure 4:
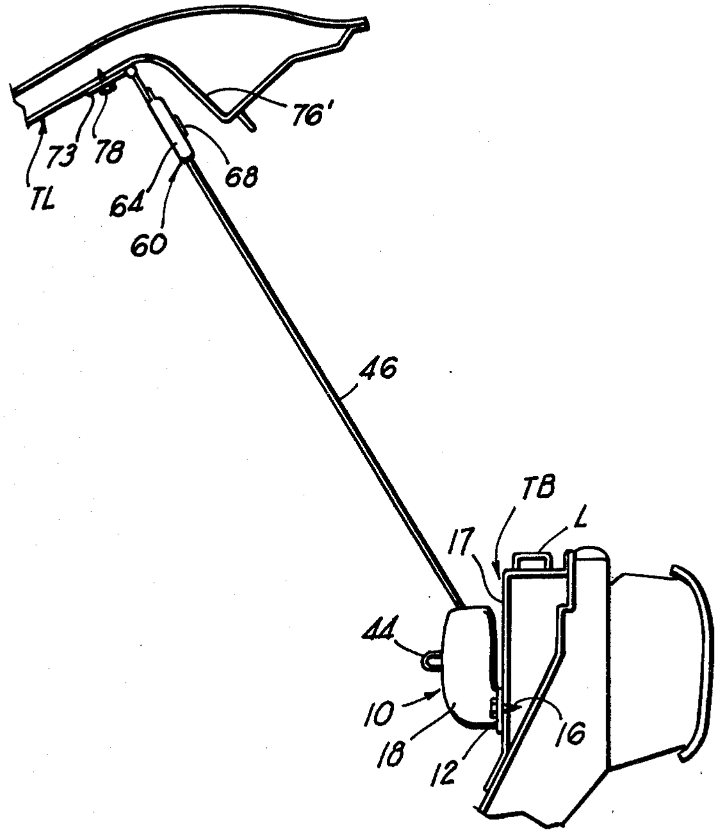
FIG. 4 is a side elevational view of the device during use.
Figure 5:
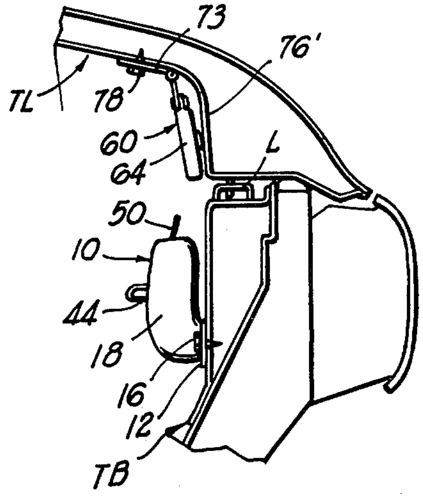
FIG. 5 is a similar view of the device when idle.

Referring to the drawings in detail, wherein like numerals designate like parts, the numeral 10 designates a belt carrier in its entirety having a mounting plate 12, apertured at 14 to receive mounting screws 16. These mounting screws anchor the belt carrier to the vertical web 17 of a bracket which supports a trunk lid latch L. The bracket thus forms an integral part of the automobile trunk bed TB, as shown in FIGS. 4 and 5.

Figure 2:
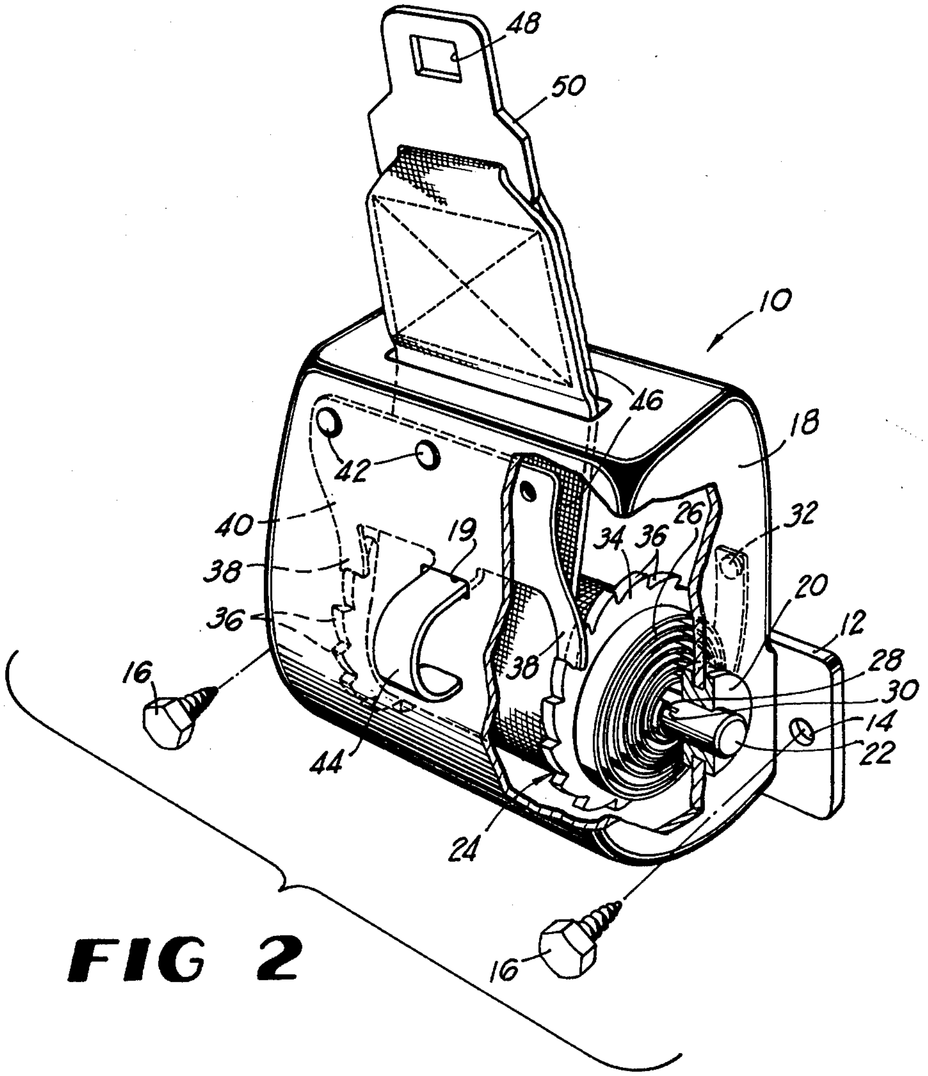
FIG. 2 is an enlarged cut-away perspective view of an extensible and retractable strap and its housing and mounting means.

The mounting plate 12 is fixed to a housing 18 of the belt carrier, and the sides of the housing carry bearings 20 for the rotational support of a belt reel axle 22, the reel 24 being disposed within the housing 18, FIG. 2. At one side of the reel 24 is a helical retraction spring 26 having at its innermost end a tang 28 which is received in a slot 30 of the axle 22.

The opposite end of the spring 26 is attached by a brad 32 to a wall of the housing 18. The reel 24 has ratchet teeth 36 at its opposite ends which are engaged by pawls 38 which extend from a central pawl plate 40, fixed to the interior of the housing 18 by brads 42.

The pawl plate 40 carries an integral pawl disengaging tongue 44 projecting through a slot 19 in the housing 18 to the exterior of the housing. When the tongue is pulled away from the housing 18 by a user, the pawls 38 are disengaged from ratchet teeth 36, allowing the belt 46 which is attached to the reel 24 to be extended, the coil spring 26 yielding to allow this. When the tongue 44 is released, the plate 40 which is resilient returns the pawls 38 into active engagement with the ratchet teeth 36. Therefore, when the device is in use, FIGS. 1 and 4, with the belt 46 extended to hold down the automobile trunk lid TL, the interlocking engagement of the pawls 38 with the ratchet teeth 36 will solidly prevent any further upward displacement of the trunk lid, as when the automobile passes over bumps. When the belt 46 is released for retraction, as will be further described, it will be wound up by the spring 26 on the reel 24 inside of housing 18 and at this time the ratchet teeth 36, due to their curvature and tapered construction, can simply trip over the pawls 38 while the strap is being rewound on the reel. A suitable alternative to the integral pawl disengaging tongue 44 can be found in seat belt mechanisms that automatically lock and release, as necessary, the length of strap needed without requiring a manual release means.

The strap 46 is preferably a nylon strap of the same type employed for automotive seat belts. At its leading end, it carries a flat male buckle component 50 having an aperture 48.

Figure 3:
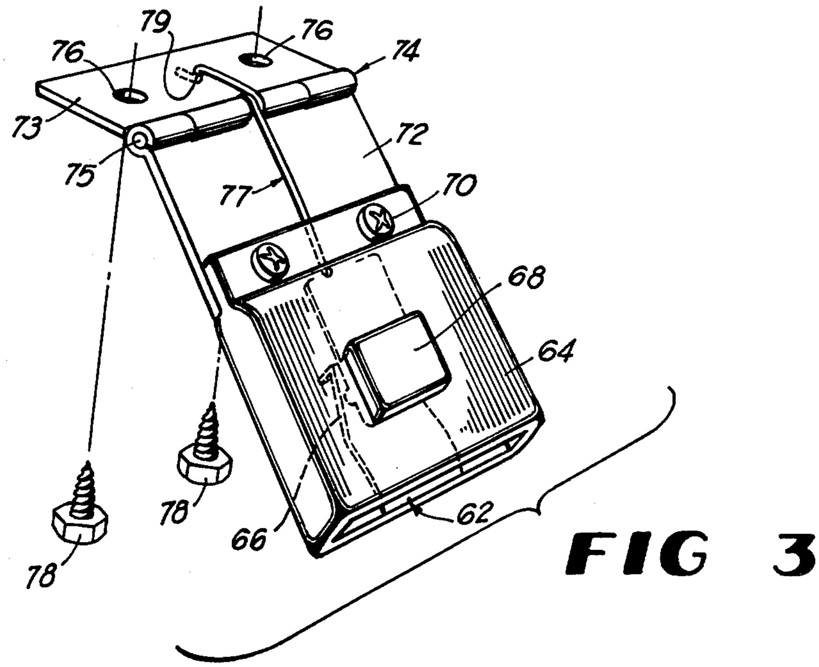
FIG. 3 is a perspective view of the trunk lid mounted strap buckle component and its spring biased mounting hinge.

Referring to FIG. 3, a trunk lid mounted buckle assembly 60 comprises a conventional seat belt type female buckle component 64 having an entrance slot 62 in its leading end for the reception of the male buckle component 50. When the element 50 is inserted into the slot 62, the aperture 48 is engaged lockingly by a resilient cam lock 66. This cam lock can be released from the aperture 48 by the user depressing a release button 68 provided on the buckle component 64. This arrangement is conventional and is found in the ordinary automotive seat belt buckle arrangement. Buckles of this type are very easy to engage and release and this ease and convenience of operation is important to the success of the invention.

The buckle component 64 is attached by screws 70 to one leaf 72 of a hinge 74 having a second leaf 73, apertured at 76 to receive screws 78 which are employed to secure the leaf 73 firmly to the bottom of the trunk lid TL immediately forwardly of an internal vertical web 76' thereof.

A torsion spring 77 for the hinge 74 is coiled around the hinge pintle 75 and has one terminal anchored within an aperture 79 of the leaf 73 and its opposite terminal clamped between the leaf 72 and buckle component 64, FIG. 3.

As illustrated in FIG. 5, when the two buckle components 64 and 50 are separated, as when the trunk lid is closed, the torsion spring 77 holds the buckle component 64 firmly against the trunk lid web 76' in a rattle-free out of the way location. As already noted, the belt carrier assembly 10 is positioned close to the vertical web 17 near the rear wall of the trunk bed and is also out of the way of luggage and other cargo in the trunk.

Figure 1:
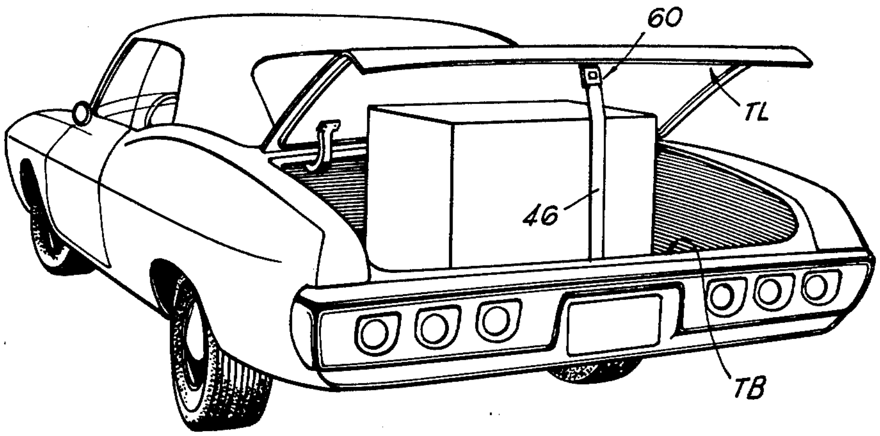
FIG. 1 is a perspective view of the invention during use.

As illustrated in FIGS. 1 and 4, when a large box or other oversized load is to be transported in an automobile trunk, the trunk lid TL can remain safely open and will be held securely by the invention. The release tongue 44 is simply pulled to disengage the pawls 38 from ratchet teeth 36 and the strap 46 is extended the required amount to enable the male buckle component 50 to engage in and be locked within the component 64. The trunk lid is brought down firmly on the oversized load and the pawls 38 will engage with particular teeth 36 of the reel when the tongue 44 is released. This firmly locks the strap 46 against further extension and prevents the trunk lid from bouncing or otherwise moving upwardly during transport of the load. At the end destination it is merely necessary to depress the release button 68 for separating the buckle components 50 and 64. When this is done, the spring reel 24 will automatically rewind the strap 46 to its housed position shown in FIG. 5 and the spring 77 will return the buckle component 64 to its non-use position against the trunk lid web 76'. Thus, the invention is characterized by simplicity, convenience of use, and freedom from rattling. The device has eye appeal and should be particularly acceptable to automobile owners who would tend to reject competitive devices having a cruder or less finished appearance. The advantages of the device over the prior art should be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A holding device for an automobile trunk lid during transporting of oversized cargo in the automobile trunk, said device comprising a first buckle component, a hinge carrying the first buckle component and having one leaf thereof attached to the first buckle component and a second leaf adapted for attachment to the underside of an automobile trunk lid, a spring connected with the hinge and biasing the first leaf in a direction holding the first buckle component against the interior of the trunk lid during periods of non-use of the device, a trunk lid holding strap, a spring reel connected with the strap and tending to reel in the strap to a retracted position, means for attaching the spring reel to the bed of an automobile trunk in opposing relation to said first buckle component, and a second buckle component carried by the free end of said strap and engageable lockingly and releasably with the first buckle component when the strap is extended from the spring reel, and pawl and ratchet means connected with the spring reel and being normally active to allow free strap rewinding movement of the spring reel while positively locking the spring reel against strap unwinding movement and including release means allowing such strap unwinding movement.

2. A holding device for an automobile trunk lid as defined in claim 1, and said means for attaching the spring reel to the bed of an automobile trunk comprising a flanged housing for the spring reel, said pawl and ratchet means comprising at least one toothed ratchet wheel on the spring reel within said housing, a resilient pawl connected with the housing within the housing and being normally actively engaged with said ratchet wheel, and a pawl release extension projecting through an opening of the housing to the exterior of the housing, whereby the pawl can be released manually from the ratchet wheel to allow extension of said strap a required distance, the releasing of said extension allowing the pawl to then lockingly engage the ratchet wheel and prevent further extension of the strap from the housing while allowing said spring reel to freely retract and rewind said strap when said second buckle component is released from the first buckle component.

3. A holding device for an automobile trunk lid as defined in claim 2, and said pawl and ratchet means comprising a pair of ratchet wheels on opposite ends of said spring reel, a resilient pawl plate secured to a wall of said housing and having a pair of pawl extensions normally actively engaged with said ratchet wheels, and a center pawl release tongue on said pawl plate projecting through said opening of the housing between said pawl extensions.

4. A holding device for an automobile trunk lid as defined in claim 1, and said first buckle component comprising a female buckle component having an end slot and a release button on one side thereof for internal locking means, said second buckle component comprising a male component adapted to enter said slot and having an aperture to interlock with said internal locking means.

5. A holding device for an automobile trunk lid during transporting of oversized cargo in the automobile trunk that includes at least two components, a movable lid and a stationary bed, said device comprising a first buckle component adapted for attachment to the interior of a first trunk component, a trunk lid holding strap, a spring reel connected with the strap and tending to reel in the strap to a retracted position, means for attaching the spring reel to the interior of a second trunk component in opposing relation to said first buckle component, and a second buckle component carried by the free end of said strap and engageable lockingly and releasably with the first buckle component when the strap is extended from the spring reel, a pawl and ratchet means connected with the spring reel and being normally active to allow free strap rewinding movement of the reel while positively locking the reel against strap unwinding movement, said pawl and ratchet means comprising a pair of ratchet wheels on opposite ends of said reel, a housing for the reel, a resilient pawl plate secured to a wall of said housing and having a pair of pawl extensions normally actively engaged with said ratchet wheels and a center pawl release tongue on said pawl plate projecting through an opening in said housing between said pawl extensions and adapted to release said pawl extensions from the ratchet wheels to allow unwinding movement of the strap.

* * * * *